United States Patent [19]

Bayham

[11] 4,294,574
[45] Oct. 13, 1981

[54] METHOD OF MAKING SEAL FOR FLEXIBLE CONTAINER

[75] Inventor: Edward L. Bayham, Mundelein, Ill.

[73] Assignee: Baxter Travenol Laboratories, Inc., Deerfield, Ill.

[21] Appl. No.: 89,815

[22] Filed: Oct. 29, 1979

Related U.S. Application Data

[62] Division of Ser. No. 17,529, Mar. 5, 1979, Pat. No. 4,234,026.

[51] Int. Cl.³ ............................................. B31B 1/84
[52] U.S. Cl. .................................... 493/213; 493/929
[58] Field of Search ............... 93/8 VB, 8 WA, 35 R; 150/1, 8, 9; 53/133, 140, 141; 128/214 B, 214 D, 272; 493/213, 212, 87, 929, 927

[56] References Cited

U.S. PATENT DOCUMENTS

| | | | |
|---|---|---|---|
| 2,894,510 | 7/1959 | Bellamy, Jr. | 128/272 |
| 2,940,444 | 6/1960 | Beall | 128/214 D |
| 3,211,144 | 10/1965 | Nehring | 128/214 D |
| 3,327,709 | 6/1967 | Nehring et al. | 128/272 X |
| 3,343,541 | 9/1967 | Bellamy, Jr. | 128/272 |
| 3,788,374 | 1/1974 | Saijo | 128/214 B X |
| 4,183,434 | 1/1980 | Watt | 128/214 D X |

FOREIGN PATENT DOCUMENTS 883556  10/1971  Canada .............................. 93/8 VB Primary Examiner—James F. Coan
Attorney, Agent, or Firm—Paul Flattery; Garrettson Ellis

[57] ABSTRACT

Sealed, flexible containers may be manufactured with a sterile, openable seal member by inserting part of a thermoplastic tube between a seal in such a manner as to permit the tube to communicate across the seal. In manufacture, the outer end of the tube may be enclosed with a thermoplastic pocket member having open inner and outer ends. A mandrel is inserted through the outer end of the pocket member and the tube. The thermoplastic sheet members, tube, and inner end of the pocket member are sealed together. Following this, the mandrel is withdrawn through the outer end of the pocket member which outer end is then also sealed, for a sterile seal, if desired. A novel design for a container seal is also disclosed.

13 Claims, 7 Drawing Figures

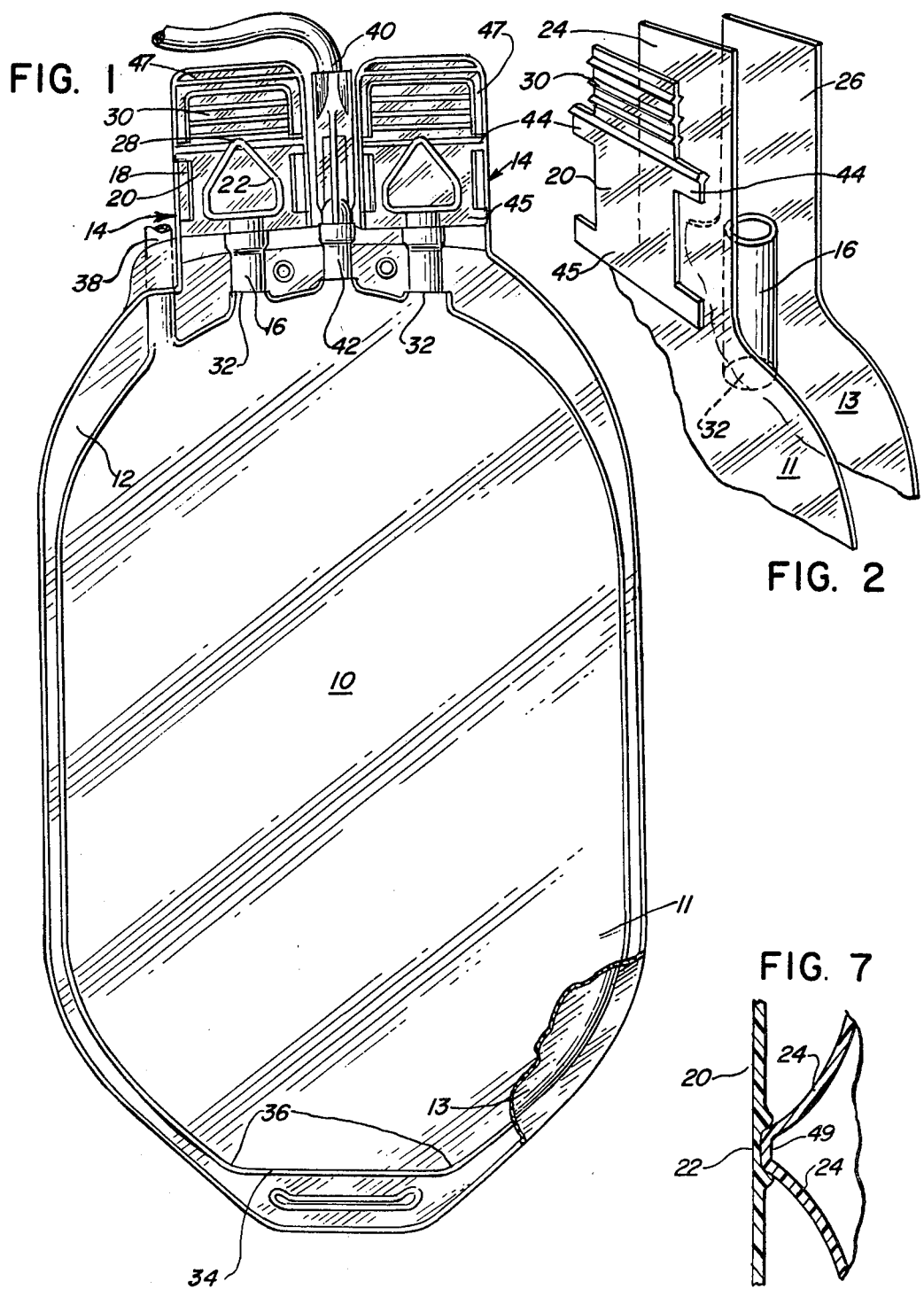

METHOD OF MAKING SEAL FOR FLEXIBLE CONTAINER

CROSS-REFERENCE TO RELATED APPLICATION

This application is a division of U.S. application Ser. No. 17,529 filed Mar. 5, 1979 now U.S. Pat. No. 4,234,026.

BACKGROUND OF THE INVENTION

In Saijo U.S. Pat. No. 3,788,374 a parenteral solution bag is shown having access ports which are closed with a tear seal, openable by manipulation of a rearwardly extending tear tab. The tear seal comprises a tube passing through a peripheral seal used to join a pair of flexible plastic sheets together into a bag, with the tube carrying a diaphragm across its bore at a position intermediate of the ends of the tube. An outer seal about the tube comprises a closed envelope with a tear tab, for tearing open the envelope.

The container of the above-cited Saijo patent may be manufactured by inserting a mandrel through an open rear end of the unsealed bag, and into the inner portion of the tube which is sealed across the peripheral seal line of the bag, so that the sealing operation does not collapse the tube, the mandrel providing a source of rigid resistance. The mandrel of course cannot advance outwardly through the tube any farther than the diaphragm which occludes the bore of the tube.

After the sealing step, the mandrel is withdrawn from the inner end of the tube and the inside of the bag, and the end of the bag is sealed.

The above manufacturing process is cumbersome, since it is clearly inconvenient to have to open up the end of a pair of thin plastic sheets to insert a mandrel through the entire length of the bag.

In the invention of this application, the sealing mandrel can enter the flow tube which crosses the sealed periphery of the bag from the outside of the bag, providing very substantial manufacturing convenience, and avoiding the need for the mandrel to pass the entire length of the interior of the plastic sheets which are sealed together to form the bag.

Furthermore, the simpler outward approach of the mandrel opens the opportunity for automated assembly of the closure system of this invention, providing potentially great cost savings.

Also, other design advantages of the bag of this invention are provided over the containers of the known prior art and particularly that of the cited Saijo patent, and also U.S. Pat. No. 3,343,541, specifically, for example, by the fact that in the sterile openable seal of this invention, the inner portions of the outer seal, upon opening, surround the sterile outer end of the flow tube more uniformly, for added assurance that contamination of the sterile outer portion of the tube will be prevented.

DESCRIPTION OF THE INVENTION

In accordance with this invention, a method is provided for sealing a flexible container with a sterile, openable seal member, which comprises the following:

inserting a thermoplastic tube between a thermoplastic member with a portion of the tube communicating outwardly beyond said member;

enclosing the outer end of said tube with a thermoplastic pocket member having an open outer end;

inserting a mandrel through the outer end of said pocket member and said tube;

sealing said thermoplastic member, tube, and inner end of the pocket member together such that the inner and outer ends of the tube communicate through said seal;

withdrawing said mandrel through the outer end of the pocket member; and sealing the outer end of the pocket member.

It may be desirable for a rupturable membrane or diaphragm to be positioned at the inner end of the tube. Accordingly, the conventional advantage of the rupturable membrane seal can be achieved (these membranes being utilized in the commercially available blood bags) while at the same time making it possible for the mandrel to be inserted through the thermoplastic tube from the exterior, avoiding the cumbersome technique of achieving access through the entire bag.

As an added advantage, the placement of the rupturable diaphragm at the inner end of the tube prevents the entrapment of blood cells or the like within the exposed inner segment of the tube during processing in the event when the seal member of this invention is utilized in conjunction with blood bags and the like.

As an alternative technique which is contemplated to be within the scope of this invention, the thermoplastic tube may be pre-formed to carry the thermoplastic pocket member which seals its outer end. In this instance, the above-described step of enclosing the outer end of the tube with the thermoplastic pocket member is accomplished prior to the inserting step of the thermoplastic tube between the thermoplastic sheet members. Accordingly, it is contemplated that the steps of the method of this invention described above are not necessarily performed in the order specified, but certain other orders of operation can also be performed in accordance with this invention.

Preferably, tear means are formed on the pocket member so that the pocket member may be manually torn to expose the outer end of the thermoplastic tube to the exterior, when it is desired to gain access to the contents of the container or to fill it. This tear means may comprise an annular line of tearing weakness formed on the pocket member for tearing open the pocket member. In the specific embodiment shown, the annular line of tearing weakness is positioned on one face of the pocket member. Alternatively, an annular or almost annular line of tearing weakness may be positioned circumferentially about the pocket member in normal relation to the axis of the tube, so that a whole upper portion of the pocket member may be removed or folded back.

The tear line may form a sealed junction between one face of the pocket member and an additional thermoplastic sheet, sealed to one side of the pocket member by the tear line and defining an apex. Accordingly, tearing of the additional sheet can cause rupture of the pocket member along the seal line, beginning at the apex.

The specific design for a sterile openable seal member for a container in accordance with this invention may comprise a tube extending across a container seal for flow communication between the container interior and the exterior. A flexible plastic pocket member sealingly encloses the outer end of the tube, while tear means for opening the pocket is provided for access to the tube. The tear means comprises an added, flexible sheet attached to the pocket member by a rupturable seal line which defines an outwardly pointing apex. The added sheet further defines a free tab portion positioned outwardly from the apex. As a result, the seal line may be ruptured, beginning at the apex, by pulling the tab portion to open the pocket member.

As an advantage of this configuration relating to sterile containers, the sterile inner portion of the pocket member, after opening, provides improved protection against accidental contamination of the outer end of the tube than in the case of the design of the previously cited patent, because more sterile material surrounds the immediate vicinity of the outer end of the tube.

Referring to the drawings, FIG. 1 is a plan view of a container with a portion broken away, which carries a pair of the seal members of this invention.

FIG. 2 is an exploded, fragmentary perspective view of one of the seals of this invention and part of its associated container, prior to sealing.

FIG. 7 is a fragmentary, magnified, sectional view of the tear seal line, taken along line 7—7 of FIG. 5.

Figure 4:
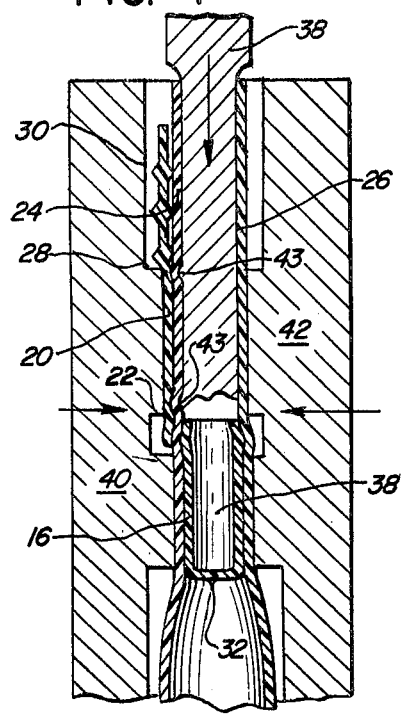
FIG. 4 is a longitudinal sectional view, taken along line 4—4 of FIG. 3 of the container of this invention in the same assembly step as that of FIG. 3.

Referring to the drawings, container 10, which may be a blood bag, is made of a pair of plastic sheets 11, 13 sealed together by a heat seal area 12 about the periphery of the bag. Sterile, openable seal members 14 are made in accordance with this invention. Seal members 14 each comprise a tube 16 extending across the heat seal area 12, for flow communication between the interior of the bag 10 and the exterior.

A flexible plastic pocket member 18 sealingly encloses the outer end of each tube 16, being made of sheet extensions 24, 26, integral with sheets 11, 13 and sealed together at their periphery.

Tear means are provided for opening the pocket member for access to the tube. These tear means comprise an added flexible sheet 20 attached to the pocket member by a rupturable seal line 22 as shown for example in FIG. 1. Added flexible sheet 20 is attached as shown to the pocket member by the rupturable seal line 22, which, in other words, constitutes a sealed junction between added flexible sheet 20 and sheet extension 24 forming one side of the pocket member.

The rupturable seal line 22 defines an apex 28 pointing outwardly from bag 10, with the added sheet 20 further defining a free tab portion 30 positioned outwardly from the apex with respect to bag 10. As a result of this, tab 30 may be gripped and pulled relative to the rest of pocket member 18, causing the rupturing of seal line 22 beginning at apex 28. The rupture takes place in sheet extension 24, causing the pocket member 14 to be opened for exposure of the outer end of tube 16. The hole that is opened by the pulling of outer end 30 to rupture seal line 22 is essentially of the shape of seal line 22.

Rupturable diaphragm 32 is shown in FIG. 1 to be positioned at the inner end of tube 16. This provides manufacturing advantages as previously described, and also prevents the contents of the container, for example red or white blood cells, from becoming entrapped in the tube prior to rupturing of the diaphragm. When a spike on a blood set or the like penetrates tube 16, it easily passes through diaphragm 32 for final opening of the bag.

As shown in FIG. 1, bag 10 defines a generally rounded tail end as at 34, with end corners 36 of no less than about 120°, to avoid entrapment of blood during processing of the bag, particularly centrifugation. Instead, the generally rounded configuration includes only two seal line angles 36, of about 120° to 160° or so, e.g., 133°, for reduction of the problem of entrapment of blood components during centrifugation and the like, as disclosed in my U.S. patent application Ser. No. 937,008, filed Aug. 25, 1978.

Blood bag 10 also carries a donor tube 38 (broken away for convenience of disclosure) which may be of conventional design, and a second tube 40 for communication with another blood bag in the conventional manner of multiple blood bag technology. A breakaway valve member 42 is provided, being of the type as described in the Carter, et al. U.S. patent application No. 818,357, filed July 25, 1977, although other conventional valving members may be used as a substitute if desired.

Figure 3:
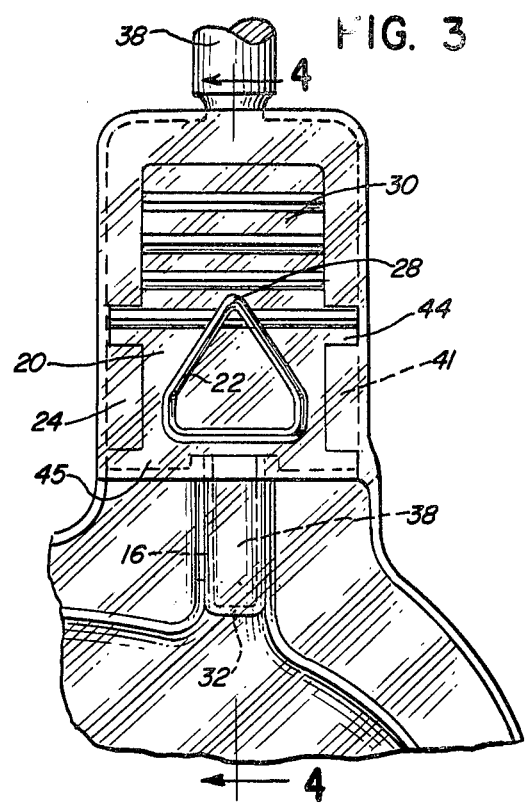
FIG. 3 is an elevational view of a first assembly step of the container of this invention.
Figure 5:
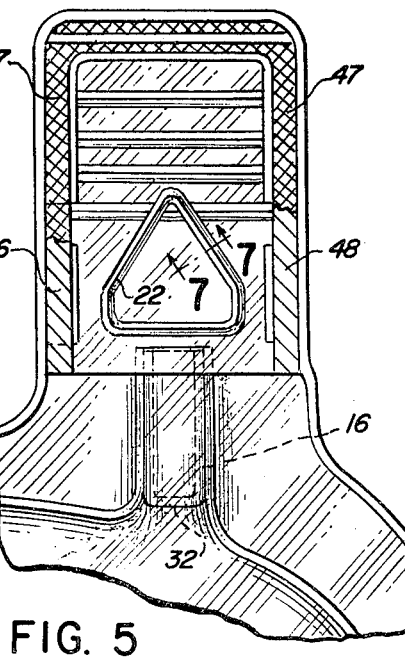
FIG. 5 is an elevational view similar to FIG. 3 of the container of this application in a later stage of assembly.

The blood bag of this application may be manufactured as shown, for example, in FIGS. 3 through 5. The manufacturing procedure is deemed to be a significant improvement over previous manufacturing procedures in that it is more susceptible to automation. For example, the added flexible sheet 20 may be applied to the bag-forming sheets 11, 13 as a perforated ribbon, with the heat sealing step being immediately preceded or followed by cutting one unit of the added sheet 20 away from its ribbon before, during, or after the sealing step has taken place. Similarly, the individual sheets 11, 13 may be cut from rolls of plastic on a continuous, automated process and sealed together in the operation described here.

In a first sealing step for the seal member of this invention, as shown in FIGS. 3 and 4, tube 16, having a preformed diaphragm 32 at its inner end, is inserted between sheet extensions 24, 26. Added sheet 20 is also laid in its position. Mandrel 38 is advanced between sheet extensions 24, 26 and through preferably essentially the entire length of tube 16, and sealing dies 40, 42 are applied, to effect the heat-sealing of tube 16 to sheet extensions 24, 26, and the sealing of added sheet 20 to sheet extension 24. Additionally, rupturable seal line 22 is formed as a separate seal between sheets 20 and 24, while tab 30 remains free for manual tearing of sheets 20, 24 apart.

Rupturable seal line 22 is shown in cross-section in FIG. 7. There, as shown, sheet extension 24 and added sheet 20 are sealed together at seal line 22 by the interaction of an enlarged portion 41 (FIG. 3) of mandrel 38, which defines a sealing ridge 43 to form the crimped line of tearing weakness 22 in an outwardly projecting position. Sealing ridge 43 presses the pair of sheets 24, 20 against a flat face on sealing die 40 with the effect, as shown in FIG. 7, that the portion of sheet extension 24 which is pressed by sealing ridge 43 is disrupted at area 49 entering into intimate sealing contact with the more intact extra sheet 20.

As the result of this, when tab 30 of sheet 20 is pulled away from pocket 14, the weakest spot in the seal is in the disrupted area 49, which assures the rupture of sheet extension 24 for opening of envelope 14, rather than the breakage of added sheet 20.

Added sheet 20 is sealed to sheet 24 at the location of tabs 44, two of which are shown to be present in this embodiment. Bottom portion 45 of sheet 20 is also sealed, preferably across its entire width. Apart from tabs 44, portion 45, and seal line 22, the remaining portions of added sheet 30 are generally not sealed to the sheet extension 24, so that the tearing action is focused as much as possible at tear line 22. On the tearing action, the outermost pair of tabs 44 are torn away, as seal line 22 is ruptured.

After the above sealing step, as shown by FIG. 5, mandrel 38 is withdrawn, and the outer peripheries 47 of sheet extensions 24, 26 are sealed together by heat seal dies 46, 48, to complete the assembly of the openable seal member of this invention. The seal member can be used to assure sterility of the container, coupled with easy opening and improved convenience in manufacture.

As an added advantage of this invention, the flat tear seal 22 which is used in this invention is generally made with less criticality of manufacturing conditions than a peel-type heat seal which has been used conventionally in blood bag technology. Accordingly, containers in accordance with this invention can be manufactured with a lower scrap rate.

Figure 6:
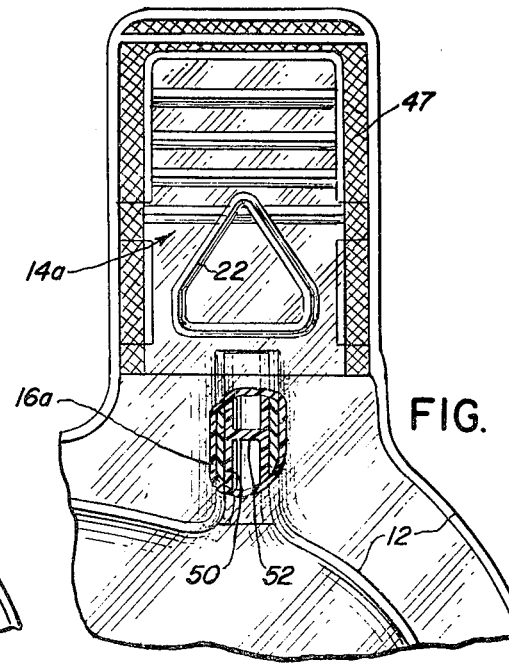
FIG. 6 is an elevational view of another embodiment of the seal member of this invention.

As a modification to the manufacturing process described above, FIG. 6 shows a blood bag having the openable seal member of this invention which has been finished through the first sealing step as shown in FIGS. 3 and 4, with the exception that tube 16a does not include a diaphragm occluding flow through its bore. Thereafter, a second tube 50 may be telescopically inserted into tube 16a and sealed by solvent sealing or the like. Tube 50 may carry a centrally-located diaphragm 52 in its bore. Thereafter, pocket member 14a may be sealed at its periphery 47 as before, to finish the openable seal member in the manner described previously, but in this instance with the added inner tubular member 50 and its centrally-located diaphragm 52.

Hence, the manufacturing advantages of this invention can be obtained, coupled with a centrally-located diaphragm which has been conventional in blood bag technology.

It is further contemplated that the openable seal member of this invention can be used on structures other than flexible bags and the like. For example, it is easily adapted for use as part of an administration set for blood, parenteral solution, or the like, where a tube passes through a seal in the set, and sheets analogous to sheets 20, 24, and 26 are sealed to the set and each other. Similarly, the openable seal member of this invention can be used on dialyzers and oxygenators for blood or the like where the pair of thermoplastic sheet members and the tube are attached to an appropriate portion thereof.

The above has been offered for illustrative purposes only and is not intended to limit the invention of this application, which is as defined in the claims below.

That which is claimed is:

1. The method of sealing a flexible container with an openable seal member which comprises:
   inserting a thermoplastic tube between thermoplastic members with a portion of the tube communicating outwardly beyond said members;
   enclosing the outer end of said tube with a thermoplastic pocket member having an open outer end;
   inserting a mandrel through the outer end of said pocket member and said tube;
   sealing said thermoplastic members, tube, and inner end of the pocket member together in a smooth, continuous seal such that the inner and outer ends of the tube communicate through said seal;
   withdrawing said mandrel through the outer end of said pocket member; and
   sealing the outer end of the pocket member.

2. The method of claim 1 in which a rupturable diaphragm is positioned at the inner end of said tube.

3. The method of claim 1 in which tear means for exposing the outer end of said tube to the exterior is formed on said pocket member.

4. The method of claim 3 in which said tear means includes an annular line of tearing weakness on said pocket member for tearing open said pocket member.

5. The method of claim 3 in which said tear means includes an additional thermoplastic sheet sealed to one side of said pocket member and defining with said one side of the pocket member tear means which comprise an annular line of tearing weakness defining an apex, whereby tearing of said additional sheet causes rupture of said pocket member along said annular seal line beginning at the apex.

6. The method of claim 5 in which said mandrel which is inserted through the outer end of said pocket member includes a ridge for forming said annular line of tearing weakness by pressing said additional thermoplastic sheet against one wall of the pocket member against an outer sealing die, to form a seal line which ruptures the wall of said thermoplastic pocket member upon pulling of the additional sheet against the pocket member.

7. The method of sealing a flexible container with an openable seal member, which comprises:
   inserting part of a thermoplastic tube between a pair of thermoplastic sheet members, with a portion of the tube extending outwardly beyond said sheet members, and surrounding the outer end of said tube with a thermoplastic pocket member having an open outer end, said pocket member being carried adjacent the outer end of said tube;
   inserting a mandrel through the outer end of said pocket member and said tube;
   sealing said thermoplastic sheet members, tube, and inner end of the pocket member together in a smooth, continuous seal such that an open passageway is provided through said tube from between unsealed portions of said sheet members to the interior of said pocket member;
   withdrawing said mandrel through the outer end of said pocket member; and
   sealing the outer end of said pocket member.

8. The method of claim 7 in which a rupturable diaphragm is positioned at the inner end of said tube.

9. The method of claim 7 in which tear means for exposing the outer end of said tube to the exterior is formed on said pocket member.

10. The method of claim 7 in which said tear means includes an annular line of tearing weakness on said pocket member for tearing open said pocket member.

11. The method of claim 7 in which said tear means includes an additional thermoplastic sheet sealed to one side of said pocket member and defining with said one side of the pocket member tear means which comprise an annular line of tearing weakness defining an apex, whereby tearing of said additional sheet causes rupture of said pocket member along said annular seal line beginning at the apex.

12. The method of claim 7 in which said mandrel which is inserted through the outer end of said pocket member includes a ridge for forming said annular line of tearing weakness by pressing said additional thermoplastic sheet against one wall of the pocket member against an outer sealing die, to form a seal line which ruptures the wall of said thermoplastic pocket member upon pulling of the additional sheet against the pocket member.

13. The method of sealing a flexible container with an openable seal member, which comprises:

inserting part of a thermoplastic tube between a pair of thermoplastic sheet members, with a portion of the tube extending outwardly beyond said sheet members, and surrounding the outer ends of said tube with a thermoplastic pocket member having an open outer end;

inserting a mandrel through the outer end of said pocket member and said tube;

sealing said thermoplastic sheet members, tube and inner end of the pocket member together such that an open passageway is provided through said tube from between unsealed portions of said sheet members to the interior of said pocket member;

withdrawing said mandrel through the outer end of said pocket member;

telescopically mounting an inner tube within the bore of said first tube in such a position that a rupturable diaphragm defined across the bore of said inner tube is positioned at a location intermediate of the ends of said first tube; and sealing the outer end of said pocket member.

* * * * *